US010661554B2

(12) United States Patent
Nagata et al.

(10) Patent No.: US 10,661,554 B2
(45) Date of Patent: May 26, 2020

(54) PRINTING DEVICE HAVING STRUCTURE CAPABLE OF SUPPRESSING DISENGAGEMENT OF BEARING FROM HOLDER DESPITE APPLICATION OF EXTERNAL FORCE TO BEARING

(71) Applicant: BROTHER KOGYO KABUSHIKI KAISHA, Nagoya, Aichi (JP)

(72) Inventors: Hikaru Nagata, Okazaki (JP); Hiroaki Kita, Nagoya (JP); Yuichiro Suzuki, Komaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 442 days.

(21) Appl. No.: 15/702,876

(22) Filed: Sep. 13, 2017

(65) Prior Publication Data

US 2018/0147827 A1 May 31, 2018

(30) Foreign Application Priority Data

Nov. 28, 2016 (JP) .................................. 2016-229652

(51) Int. Cl.
| | |
|---|---|
| *B41J 11/04* | (2006.01) |
| *B41F 13/20* | (2006.01) |
| *B41J 29/02* | (2006.01) |
| *B41J 2/32* | (2006.01) |
| *B41J 3/36* | (2006.01) |
| *F16B 2/20* | (2006.01) |

(52) U.S. Cl.
CPC ................. *B41F 13/20* (2013.01); *B41J 2/32* (2013.01); *B41J 3/36* (2013.01); *B41J 11/04* (2013.01); *B41J 29/02* (2013.01); *F16B 2/20* (2013.01)

(58) Field of Classification Search
None
See application file for complete search history.

(56) References Cited

U.S. PATENT DOCUMENTS 9,848,692 B1 * 12/2017 Kato ...................... A45F 5/021
10,000,079 B2 * 6/2018 Ikemoto .................. B41J 11/04
(Continued)

FOREIGN PATENT DOCUMENTS

| JP | 2015-160427 A | 9/2015 |
| JP | 2015-208920 A | 11/2015 |

*Primary Examiner* — Jill E Culler
(74) *Attorney, Agent, or Firm* — Scully, Scott, Murphy & Presser, PC (57) ABSTRACT

A printing device includes: a platen roller having a rotational shaft, a pair of bearings, and a holder. The bearings rotatably support end portions of the rotational shaft. Each of the bearings includes: a support portion, and an engaging portion. The support portion has an outer circumferential surface. The engaging portion is provided at the outer circumferential surface of the support portion. The holder includes a pair of fitting portions. The bearings are fitted into the fitting portions, respectively. Each of the fitting portions includes: a receiving portion configured to receive the support portion, an opening portion, and an engagement portion. The engaging portion is engaged with the engagement portion, whereby an expanding deformation of the opening portion can be restrained in a case where an external force directed in a direction toward the opening portion in the first direction is applied to the bearings.

4 Claims, 9 Drawing Sheets

(56) References Cited

U.S. PATENT DOCUMENTS

| | | | | |
|---|---|---|---|---|
| 10,131,159 B2* | 11/2018 | Inaba | ............... | B41J 29/02 |
| 2003/0058327 A1* | 3/2003 | Louis | ............... | B41J 2/32 |
| | | | | 347/220 |
| 2006/0291933 A1* | 12/2006 | Watanabe | ............ | B41J 11/005 |
| | | | | 400/58 |
| 2010/0053297 A1* | 3/2010 | Yokoyama | ............ | B41J 11/04 |
| | | | | 347/220 |
| 2017/0129260 A1* | 5/2017 | Nakamori | ............ | B41J 2/32 |

\* cited by examiner

PRINTING DEVICE HAVING STRUCTURE CAPABLE OF SUPPRESSING DISENGAGEMENT OF BEARING FROM HOLDER DESPITE APPLICATION OF EXTERNAL FORCE TO BEARING

CROSS REFERENCE TO RELATED APPLICATION

This application claims priority from Japanese Patent Application No. 2016-229652 filed Nov. 28, 2016. The entire content of the priority application is incorporated herein by reference.

TECHNICAL FIELD

The present disclosure relates to a printing device.

BACKGROUND

Portable printing devices are known in the art. Japanese Patent Application Publication No. 2015-160427 discloses a printing device provided with a belt clip. By attaching the printing device to a user's waist belt with the belt clip, the user can use the printing device portably. To this printing device, a structure disclosed in Japanese Patent application Publication No. 2015-208920 may be applicable. The printing device described in Japanese Patent application Publication No. 2015-208920 includes a rear cover supported to be opened and closed. The rear cover includes support sleeves (corresponding to bearings) for rotatably supporting both ends of a rotational shaft of a platen roller. The support sleeves may be presumably fitted with a holder, and the holder may be presumably fixed to the rear cover with a screw.

SUMMARY

However, during attachment or detachment of the printing device to and from the waist belt with the belt clip, the user may accidentally drop the printing device. Depending on the height from which the printing device is dropped, the support sleeves may be disengaged from the holder due to impact of dropping the printing device.

In view of the foregoing, it is an object of the disclosure to provide a printing device capable of suppressing disengagement of bearings from a holder even if an external force is applied to the printing device.

In order to attain the above and other objects, the disclosure provides a printing device including: a platen roller, a pair of bearings, and a holder. The platen roller has a rotational shaft extending in an axial direction. The rotational shaft has end portions in the axial direction. The pair of bearings each rotatably supports each end portion of the rotational shaft. Each of the pair of bearings includes: a support portion, and an engaging portion. The support portion has a generally hollow cylindrical shape and is formed with a through-hole through which the rotational shaft extends. The support portion has an outer circumferential surface. The engaging portion is provided at the outer circumferential surface of the support portion. The holder includes a pair of fitting portions. Each of the pair of bearings is fitted into each of the pair of fitting portions. Each of the pair of fitting portions includes: a receiving portion, an opening portion, and an engagement portion. The receiving portion is configured to contact the outer circumferential surface of the support portion to receive the support portion. The receiving portion has one end in a first direction crossing the axial direction. The receiving portion has a pair of distal ends facing each other to provide a gap therebetween at the one end of the receiving portion. The receiving portion has a generally C-shape as viewed in the axial direction. The opening portion serves as the gap defined between the pair of distal ends of the receiving portion. The engagement portion is positioned adjacent to the opening portion. The engaging portion is engaged with the engagement portion, whereby an expanding deformation of the opening portion in a second direction crossing the axial direction and the first direction can be restrained in a case where an external force directed in a direction toward the opening portion in the first direction is applied to the bearings.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

[Printing Device 1]

A printing device 1 according to one embodiment of the present disclosure will be described with reference to FIGS. 1 through 8.

The printing device 1 is a thermal printer that can print an image on a printing medium such as a heat sensitive paper. The printing device 1 may be battery powered. The printing device 1 can be attached to a user's waist belt with a belt clip (not illustrated), thereby enabling the user to carry the printing device 1 while working. The printing device 1 can be connected to an external device (not illustrated) using a USB (registered trademark) cable. The printing device 1 can print characters such as letters and graphic symbols on the print medium on a basis of print data received from the external device. The external device is a common personal computer (PC).

In the following description, a lower-right side, an upper-left side, an upper-right side, a lower-left side, an upper side and a lower side in FIG. 1 will be respectively defined as the right side, the left side, the rear side, the front side, the upper side and the lower side of the printing device 1, respectively.

Figure 1:
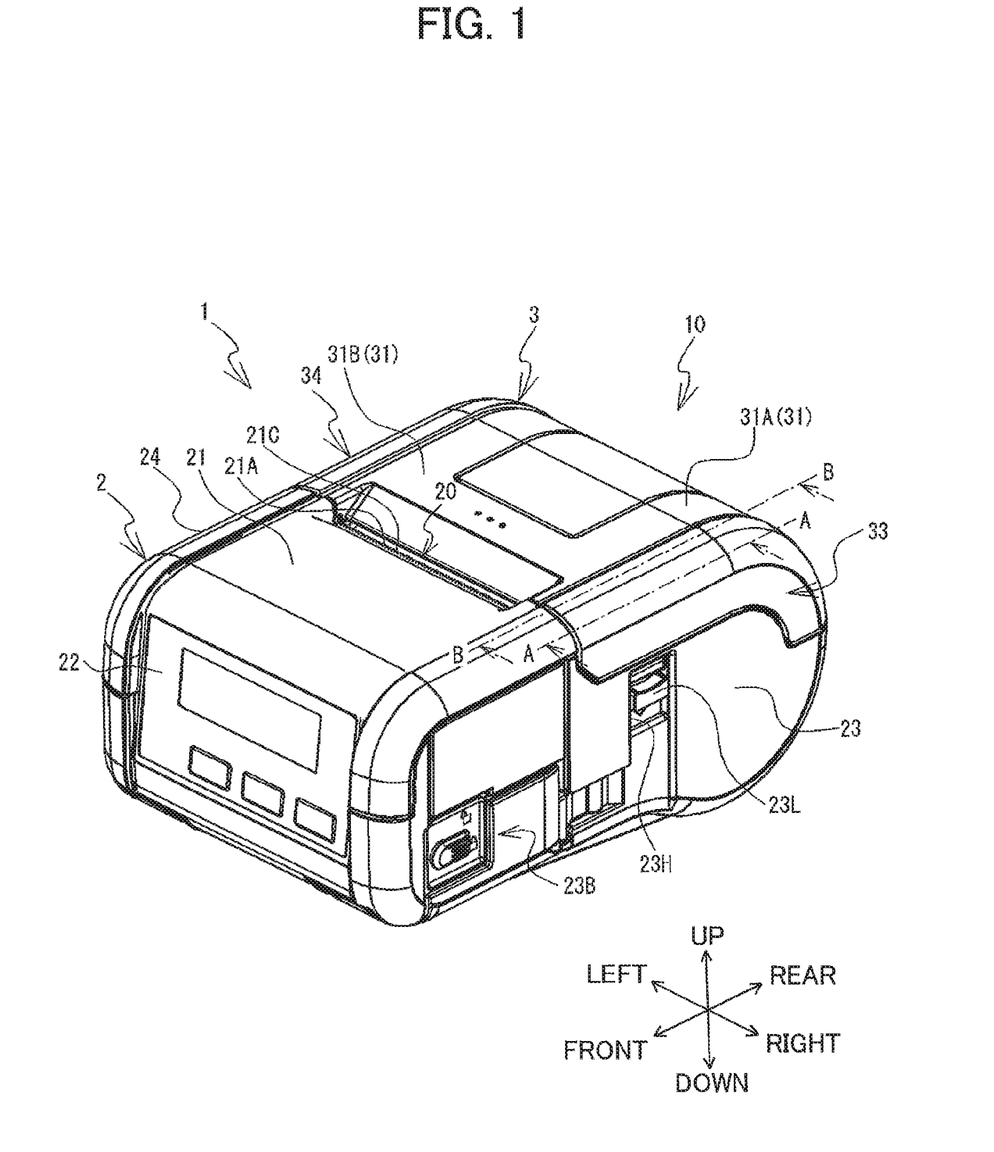
FIG. 1 is a perspective view of a printing device 1 according to one embodiment, and illustrating a state where a second cover 3 is at its closed position.
Figure 2:
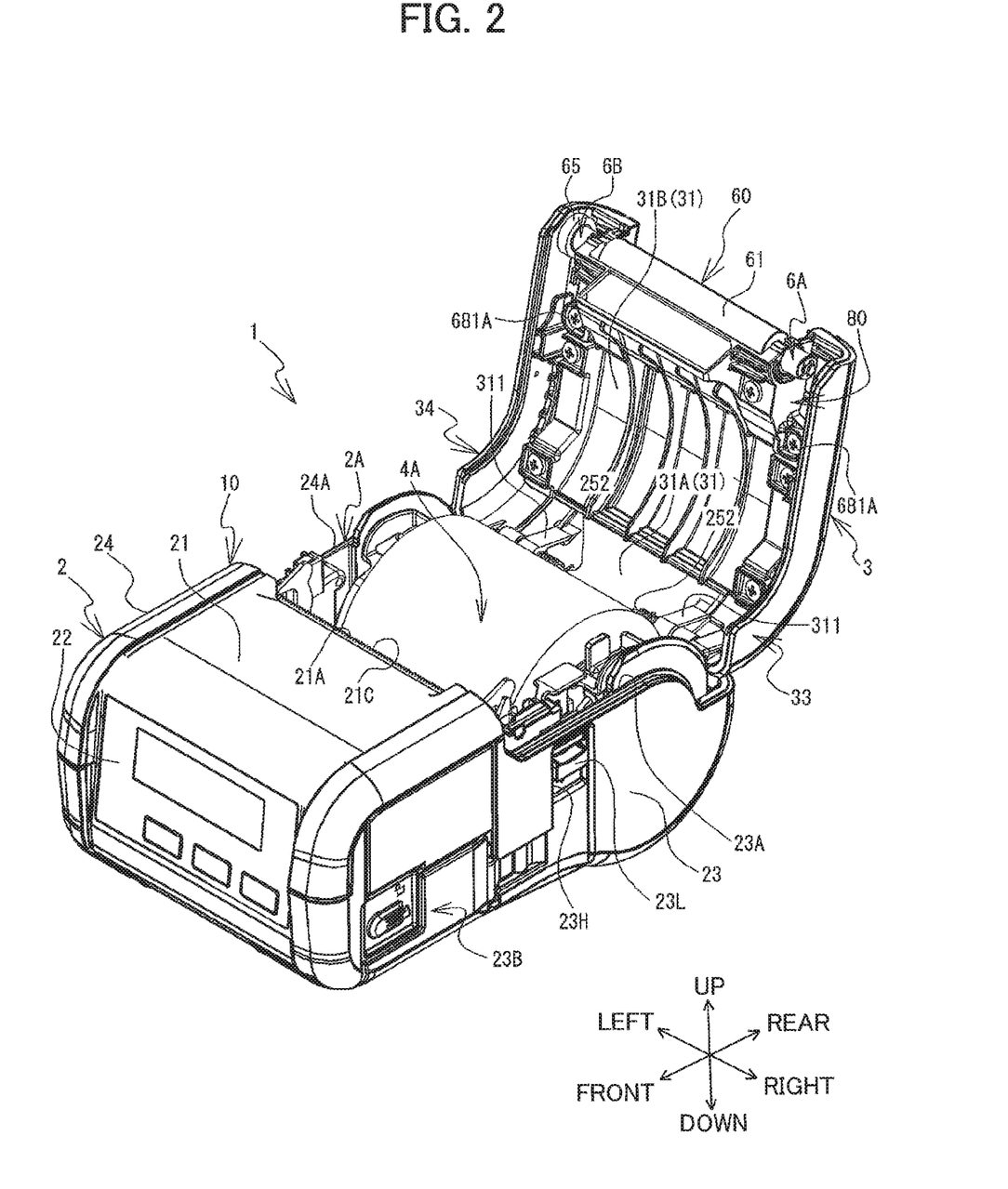
FIG. 2 is a perspective view of the printing device 1 according to the embodiment, and illustrating a state where the second cover 3 is at its open position.
Figure 3:
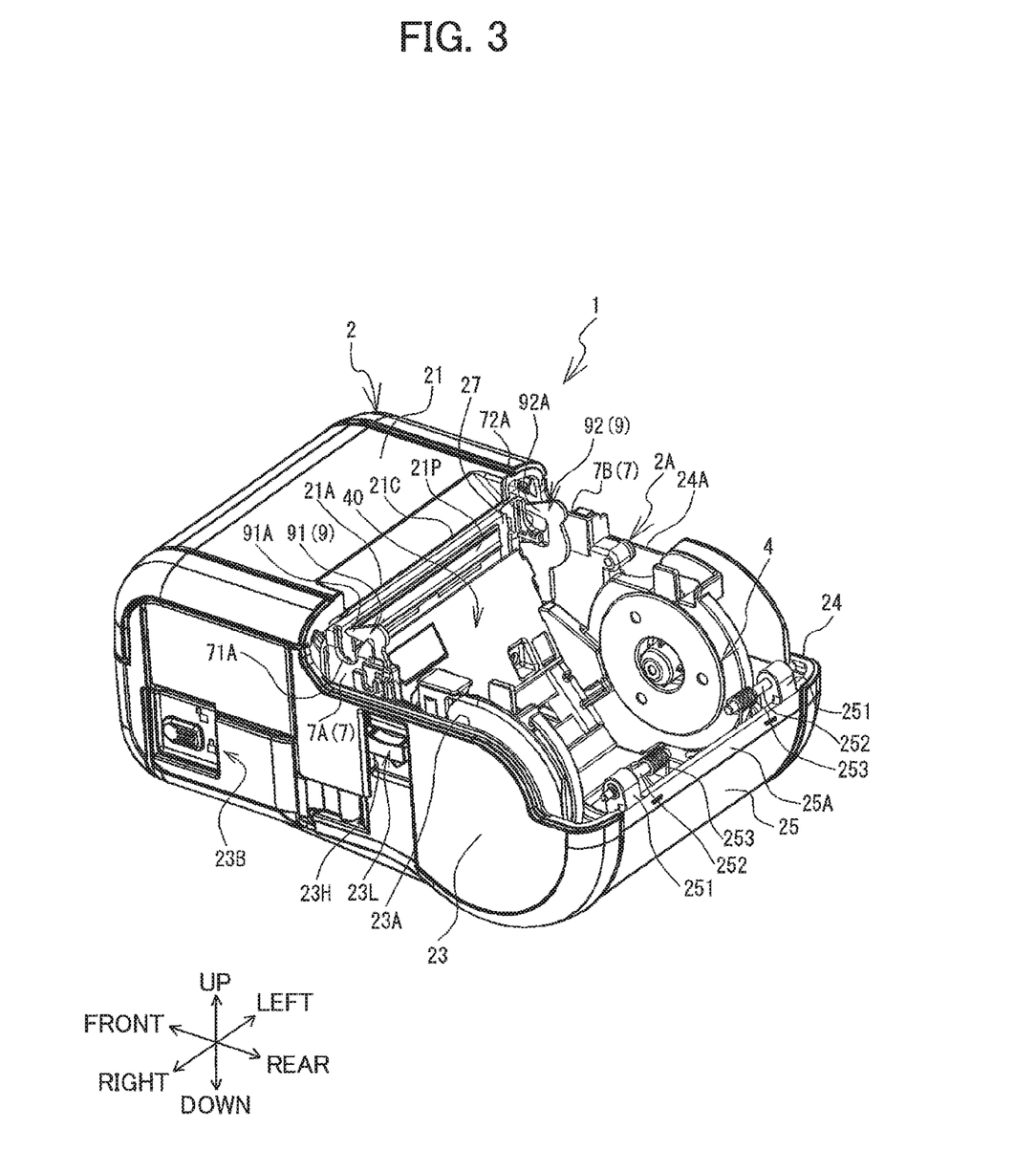
FIG. 3 is a perspective view of the printing device 1 according to the embodiment in which the second cover 3 is omitted.

As illustrated in FIGS. 1 through 3, the printing device 1 includes a housing 10. The housing 10 has a general box-like rectangular parallelepiped shape that is elongated in a frontward/rearward direction. The housing 10 includes a first cover 2 and a second cover 3.

[First Cover 2]

The first cover 2 has a box-like shape and includes a front wall 22, a right wall 23, a left wall 24, a rear wall 25 (see FIG. 3), a lower wall 26 (see FIG. 4) and a front-side upper wall 21. The front-side upper wall 21 constitutes a frontward portion of an upper wall of the housing 10. That is, the front-side upper wall 21 is positioned frontward relative to an approximate front-rear center of the upper wall of the housing 10. The right wall 23 is formed with a lever hole 23H and is provided with a battery retaining portion 23B. The lever hole 23H is a through-hole having a rectangular shape and is elongated in an upward/downward direction. A lever 23L protrudes rightward through the lever hole 23H, and is movable in the upward/downward direction within the lever hole 23H. The lever 23L is adapted to switch locking and unlocking of the second cover 3 described later. The battery retaining portion 23B is adapted to accommodate a battery as a power source of the printing device 1 and to retain the battery accommodated therein.

A main chassis (not illustrated) is disposed beneath a rear edge portion 21A of the front-side upper wall 21. The main chassis supports a motor and the like (not illustrated). The main chassis also supports the lever 23L so that the lever 23L is movable in the upward/downward direction. As illustrated in FIG. 3, the main chassis includes an inner wall portion 27 extending downward from the rear edge portion 21A of the front-side upper wall 21. The inner wall portion 27 includes a cutting blade 21C extending along the bottom of the rear edge portion 21A. The cutting blade 21C is configured to cut off a portion of the printing medium that has been printed. A thermal head 21P is disposed at a position below the cutting blade 21C. The thermal head 21P is adapted to print characters on the printing medium by applying heat to the printing medium. The main chassis further includes a pair of support portions 7. Specifically, the pair of support portions 7 includes a support portion 7A extending rearward from a right end portion of the inner wall portion 27, and a support portion 7B extending rearward from a left end portion of the inner wall portion 27. The support portion 7 is adapted to support a restriction mechanism 9 described later. Details of the support portion 7 will be described later.

The rear wall 25 has an upper edge portion 25A. Two support portions 251 protruding upward relative to the upper edge portion 25A are disposed at the rear wall 25. One of the support portions 251 extends upward from a portion adjacent to a right end portion of the upper edge portion 25A, and the remaining one of the support portions 251 extends upward from a portion adjacent to a left end portion of the upper edge portion 25A. Each support portion 251 supports a shaft portion 252 extending in a leftward/rightward direction. Each shaft portion 252 extends inward from the corresponding support portion 251. A spring 253 is disposed over each shaft portion 252.

The right wall 23 has an upper edge portion 23A, and the left wall 24 has an upper edge portion 24A. The rear edge portion 21A of the front-side upper wall 21, the upper edge portion 23A of the right wall 23, the upper edge portion 24A of the left wall 24, and the upper edge portion 25A of the rear wall 25 define an opening portion 2A. The opening portion 2A has a generally rectangular shape as viewed from above. The opening portion 2A opens an accommodating portion 40 inside the first cover 2. A roll holder 4 is accommodated in and fixed to the accommodating portion 40. The roll holder 4 is adapted to rotatably support both end portions in the leftward/rightward direction of a roll 4A (see FIG. 2) which is a roll of a printing medium.

[Restriction Mechanism 9]

The restriction mechanism 9 includes a restriction member 91, a restriction member 92, and a connection member (not illustrated). Each of the restriction members 91 and 92 has a plate-like shape. Each side surface of each of the restriction members 91 and 92 faces leftward or rightward. The restriction member 91 is positioned near the right end portion of the inner wall portion 27, and the restriction member 92 is positioned near the left end portion of the inner wall portion 27. The restriction members 91 and 92 are spaces apart from each other in the leftward/rightward direction. A protruding portion 91A is disposed at an upper end portion of the restriction member 91, and protrudes frontward therefrom. A protruding portion 92A is disposed at an upper end portion of the restriction member 92, and protrudes frontward therefrom. The restriction members 91 and 92 are coupled to each other with a coupling portion (not illustrated) provided at respective lower ends of the restriction members 91 and 92.

Figure 4:
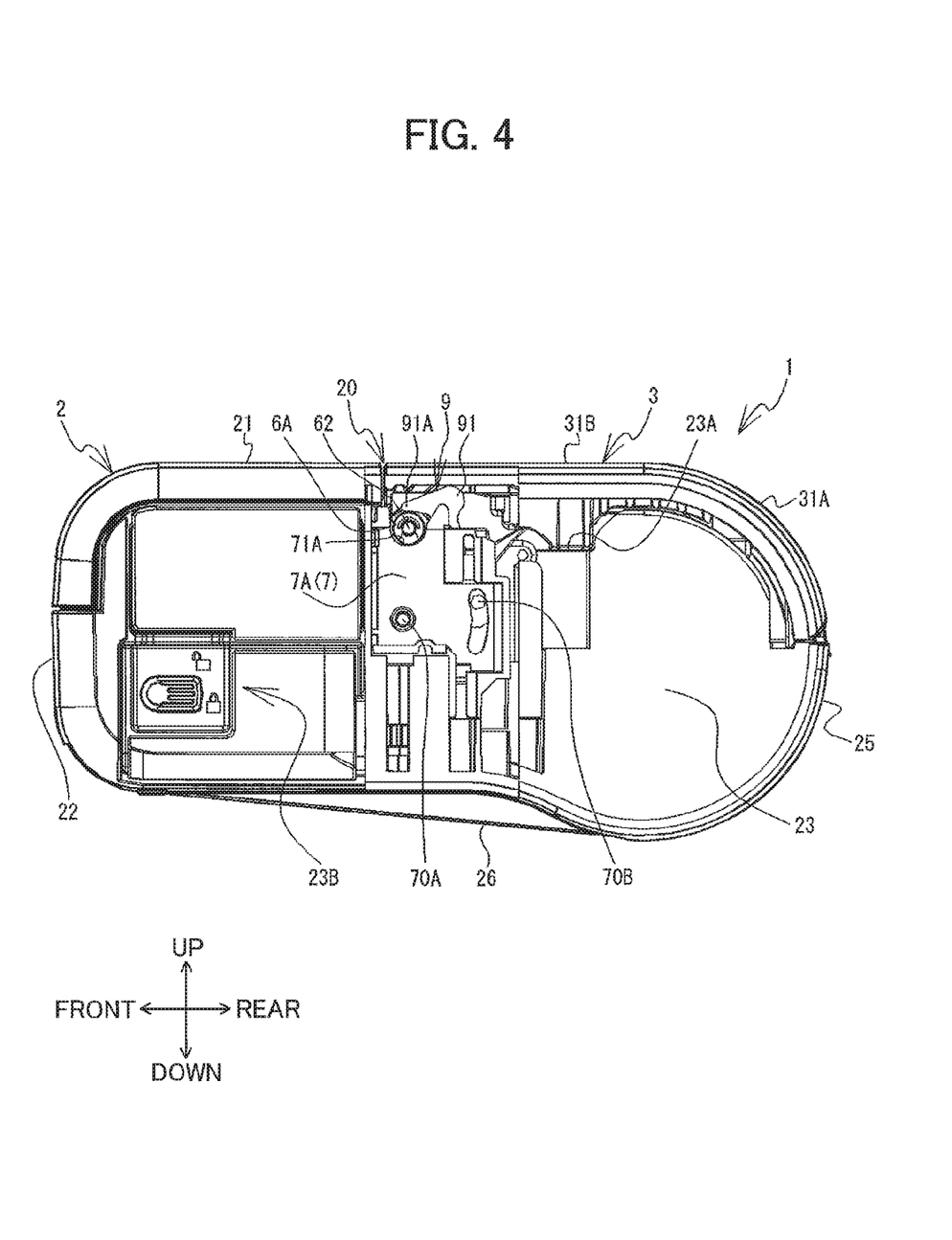
FIG. 4 is a cross-sectional view taken along the line A-A in FIG. 1 as viewed in a direction shown by an arrow.

As illustrated in FIG. 4, the support portion 7A has a shaft portion 70A extending in the leftward/rightward direction. The connection member (not illustrated) and a lower portion of the restriction member 91 are pivotally movably supported to the shaft portion 70A. The connection member is disposed between the restriction member 91 and the lever 23L (see FIG. 1) in the leftward/rightward direction. The connection member includes a shaft portion 70B that protrudes in the leftward/rightward direction.

A portion of the shaft portion 70B that protrudes leftward from the connection member is inserted through a hole (not illustrated) formed at a rear end portion of the restriction member 91. A portion of the shaft portion 70B that protrudes rightward from the connection member is inserted through a recessed portion (not illustrated) formed in the lever 23L. Thus, the connection member connects the lever 23L to the restriction member 91.

The shaft portion 70B is moved in the upward/downward direction in accordance with an operation of the lever 23L. The restriction member 91 is pivotally moved about the shaft portion 70A in accordance with the upward/downward movement of the shaft portion 70B. Incidentally, in accordance with the pivotal movement of the restriction member 91, the restriction member 92 connected to the restriction member 91 through the coupling portion is also pivotally moved in the same direction as the restriction member 91. The restriction members 91 and 92 are urged in a counter-clockwise direction as viewed from the right side by a spring (not illustrated) provided at the connection member.

In the following description, a pivotally moving direction (clockwise direction and counter-clockwise direction) is denoted as a pivoting direction of a member as viewed from a right side thereof, unless otherwise noted. Hereinafter, a state in which the restriction members 91 and 92 are pivotally moved in the counter-clockwise direction by the biasing force of the spring (see FIGS. 3 and 4) will be referred to as its "restricting state". On the other hand, a state in which the restriction members 91 and 92 are pivotally moved in the clockwise direction against the biasing force of the spring will be referred to as its "non-restricting state".

When the lever 23L is moved upward, the restriction members 91 and 92 are pivotally moved in the counterclockwise direction to move the protruding portions 91A and 92A frontward, respectively. In a state where the lever 23L is positioned at its uppermost position, the restriction members 91 and 92 are in the restricting state. In the restricting state as illustrated in FIG. 3, the protruding portion 91A is positioned above a recessed portion 71A formed at an upper edge of the support portion 7A, and the protruding portion 92A is positioned above a recessed portion 72A formed at an upper edge of the support portion 7B.

When the lever 23L is moved downward, the restriction members 91 and 92 are pivotally moved in the clockwise direction to move the protruding portions 91A and 92A rearward, respectively. In a state where the lever 23L is positioned at its lowermost position, the restriction members 91 and 92 are in the non-restricting state. In the non-restricting state, the protruding portion 91A is positioned rearward relative to the recessed portion 71A of the support portion 7A, and the protruding portion 92A is positioned rearward relative to the recessed portion 72A of the support portion 7B.

[Second Cover 3]

The second cover 3 is movable between a closed position closing the opening portion 2A (see FIG. 2) from above as illustrated in FIG. 1 and an open position opening the opening portion 2A as illustrated in FIG. 2. In the following description, directions relating to the printing device 1 will also be applied to the second cover 3, under an assumption that the second cover 3 is in the closed position. The second cover 3 constitutes a rearward portion of the upper wall of the housing 10. That is, the second cover 3 is positioned rearward relative to the approximate front-rear center of the upper wall of the housing 10.

As illustrated in FIG. 2, the second cover 3 includes a lid plate portion 31, and side plate portions 33 and 34. The lid plate portion 31 includes a first portion 31A and a second portion 31B. The first portion 31A is a curved shaped, and the second portion 31B is a flat shaped. The first portion 31A has protruding portions 311 formed on a rear edge of the first portion 31A. Each protruding portion 311 includes a hole in which each of the two shaft portions 252 of the first cover 2 is inserted. The second portion 31B extends frontward form a front edge of the first portion 31A. The side plate portion 33 is connected to a right edge of the lid plate portion 31 and curves while extending downward. The side plate portion 34 is connected to a left edge of the lid plate portion 31 and curves while extending downward.

[Holder 80]

Figure 5:
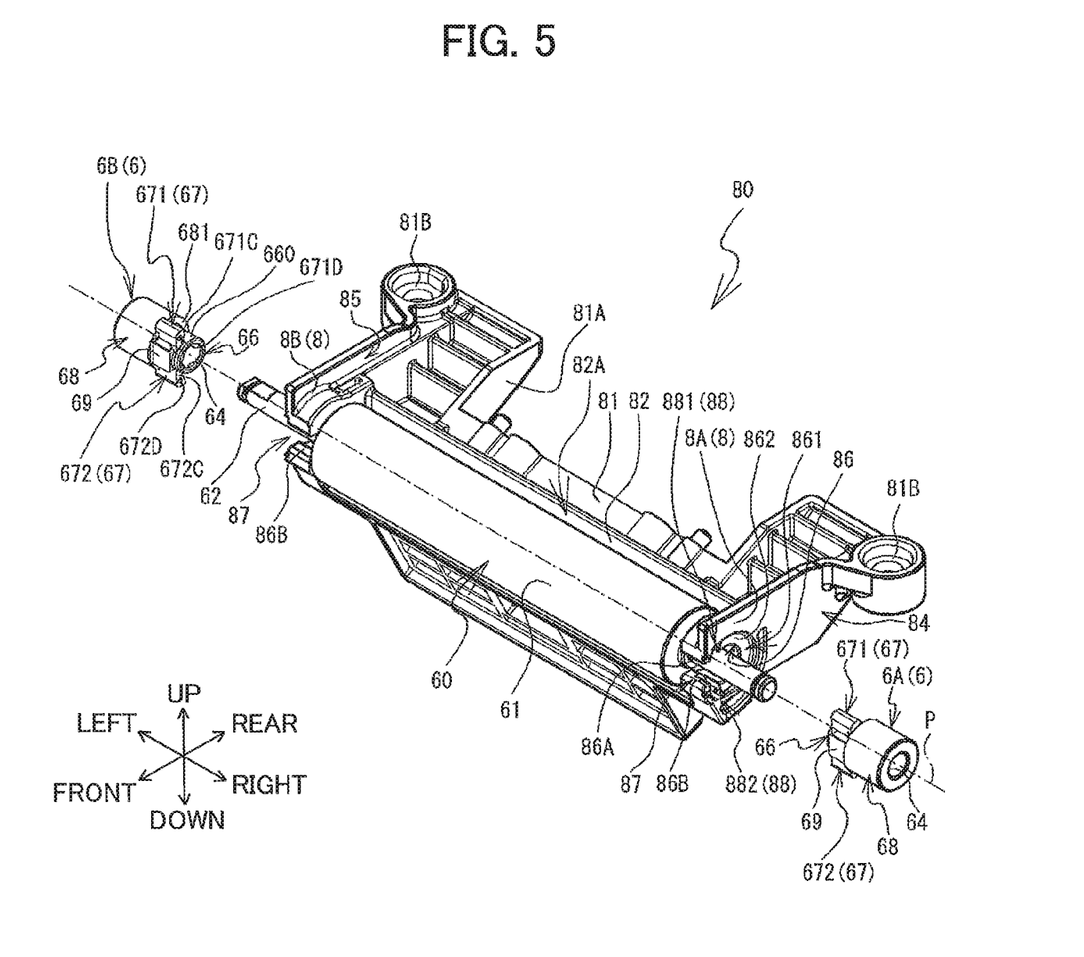
FIG. 5 is an exploded perspective view of a platen roller 60, a holder 80 and a bearing 6 in the printing device 1 according to the embodiment.

A holder 80 is provided at a position near a front end portion of an inner wall of the second portion 31B of the second cover 3. The holder 80 is adapted to support a platen roller 60 described later. As illustrated in FIG. 5, the holder 80 has a symmetrical shape in the leftward/rightward direction. The holder 80 includes a first portion 81, a second portion 82, a right wall portion 84, and a left wall portion 85.

The first portion 81 has a generally rectangular shape elongated in the leftward/rightward direction as viewed from above. The first portion 81 has a recessed portion 81A recessed frontward from a rear end portion of the first portion 81. The rear end portion of the first portion 81 has ends in the leftward/rightward direction, and a through-hole 81B is formed at each end in the leftward/rightward direction. The through-holes 81B penetrate the left end and right end of the first portion 81 in the upward/downward direction, respectively. The second portion 82 is positioned at a front end portion of the first portion 81, and has a curved shape in conformance with a shape of a platen 61 described later. Thus, the second portion 82 has a front portion providing a platen receiving portion 82A which is a space for positioning the platen 61.

The right wall portion 84 is connected to a right end of the first portion 81 and a right end of the second portion 82. The right wall portion 84 has a generally rectangular shape elongated in the frontward/rearward direction as viewed from the right side. The right wall portion 84 extends to a position frontward of the second portion 82. Therefore, a portion of the right wall portion 84 covers the platen receiving portion 82A from its right side. The left wall portion 85 is connected to a left end of the first portion 81 and a left end of the second portion 82. The left wall portion 85 has a generally rectangular shape elongated in the frontward/rearward direction as viewed from the left side. The left wall portion 85 extends to a position frontward of the second portion 82. Therefore, a portion of the left wall portion 85 covers the platen receiving portion 82A from its left side.

In the following description, the portion of the right wall portion 84 covering the platen receiving portion 82A from the right side will be referred to as a "fitting portion 8A", and the portion of the left wall portion 85 covering the platen receiving portion 82A from the left side will be referred to as a "fitting portion 8B". Further, the fitting portion 8A and the fitting portion 8B will be collectively referred to as a "fitting portion 8".

[Fitting Portion 8]

The fitting portions 8A and 8B oppose each other in the leftward/rightward direction, and have symmetrical shapes as each other in the leftward/rightward direction. In the following description, only the fitting portion 8A will be described while omitting the description of the fitting portion 8B. The terms and reference numerals of each component of the fitting portion 8A are also applicable to those of the component of the fitting portion 8B.

Figure 6:
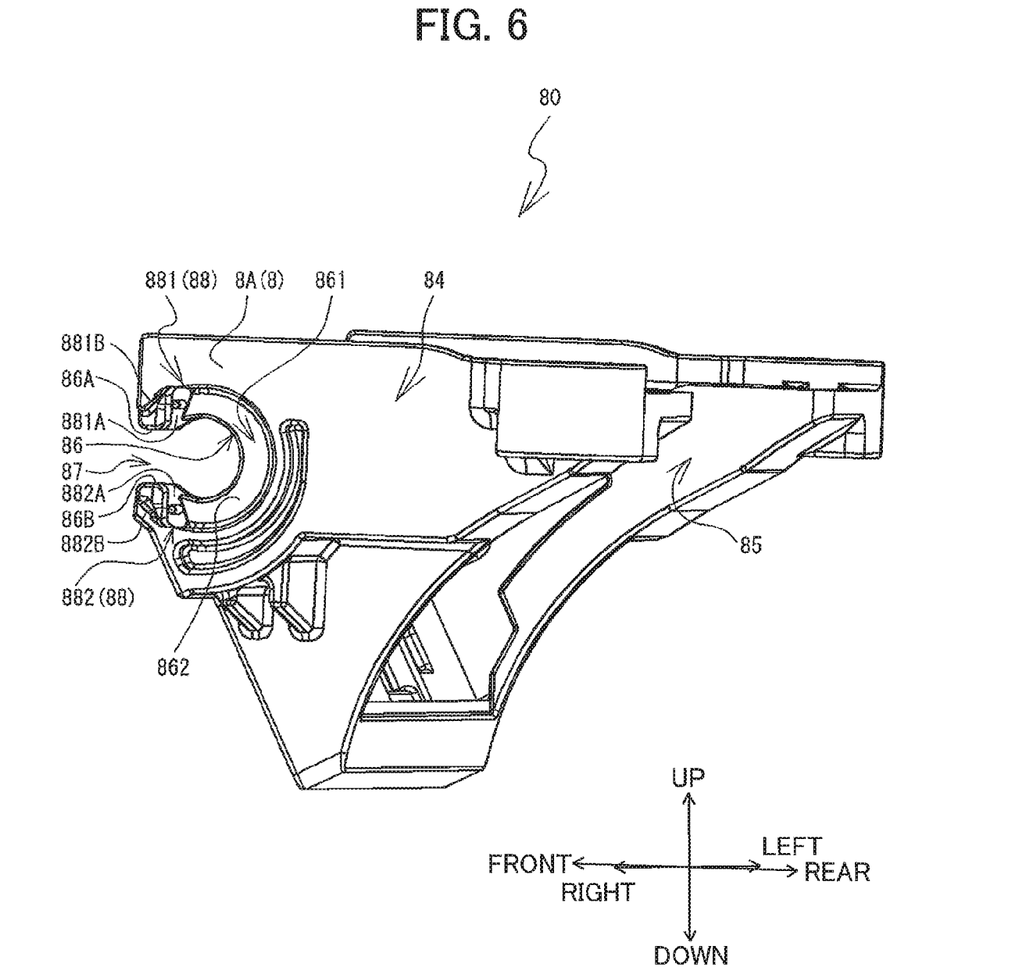
FIG. 6 is a perspective view of the holder 80 in the printing device 1 according to the embodiment.

As illustrated in FIG. 6, the fitting portion 8A includes a receiving portion 86, an opening portion 87, a recessed portion 861, and an engagement portion 88. The receiving portion 86 is recessed rearward from a front edge of the fitting portion 8A. The receiving portion 86 is a wall portion having a predetermined length in the leftward/rightward direction. The receiving portion 86 has a generally C-shape having an opening open frontward as viewed in the leftward/rightward direction.

The receiving portion 86 has distal end portions 86A and 86B that face to each other in the upward/downward direction with a gap therebetween. Specifically, the distal end portions 86A and 86B are spaced away from each other in the upward/downward direction by a gap distance L1 (see FIG. 7). The distal end portion 86A is positioned above the distal end portion 86B. The gap defined between the distal end portions 86A and 86B serves as the opening portion 87. The opening portion 87 is in communication with a space defined by the receiving portion 86 (hereinafter referred to as an "inner space of the receiving portion 86").

The recessed portion 861 is positioned radially outward of the receiving portion 86. The recessed portion 861 is recessed leftward from a right surface of the fitting portion 8A along the receiving portion 86. Hereinafter, a surface of the recessed portion 861 that faces rightward will be referred to as a "stepped surface 862". The stepped surface 862 has a predetermined radial length in a direction away from the receiving portion 86, and has a generally C-shape open frontward as viewed in the leftward/rightward direction.

The engagement portion 88 is provided at the receiving portion 86 at a position adjacent to the opening portion 87. The engagement portion 88 includes a pair of engagement portions 881 and 882. The engagement portion 881 is positioned near a rear end of the distal end portion 86A, and is recessed upward from a portion rightward of an approximate left-right center of the receiving portion 86. That is, the engagement portion 881 does not extend through the receiving portion 86 in the leftward/rightward direction. The engagement portion 881 has a front wall portion extending in the upward/downward direction. The engagement portion 881 has a rear wall portion sloping rearward with distance from the receiving portion 86. Thus, the engagement portion 881 has a generally trapezoidal shape such that a length in the frontward/rearward direction of the engagement portion 881 is gradually increased with distance from the receiving portion 86. In the following description, a surface of the engagement portion 881 that faces rightward will be referred to as an "abutment surface 881A". A protruding portion 881B is provided at the abutment surface 881A. The protruding portion 881B has a columnar shape and protrudes rightward from an approximate center portion of the abutment surface 881A.

The engagement portion 882 is positioned near a rear end of the distal end portion 86B, and is recessed downward from a portion rightward of an approximate left-right center of the receiving portion 86. That is, the engagement portion 882 does not extend through the receiving portion 86 in the leftward/rightward direction. The engagement portion 882 has a front wall portion extending in the upward/downward direction. The engagement portion 882 has a rear wall portion sloping rearward with distance from the receiving portion 86. Thus, the engagement portion 882 has a generally trapezoidal shape such that a length in the frontward/rearward direction of the engagement portion 882 is gradually increased with distance from the receiving portion 86. In the following description, a surface of the engagement portion 882 that faces rightward will be referred to as an "abutment surface 882A". A protruding portion 882B is provided at the abutment surface 882A. The protruding portion 882B has a columnar shape and protrudes rightward from an approximate center portion of the abutment surface 882A.

[Platen Roller 60]

Figure 7:
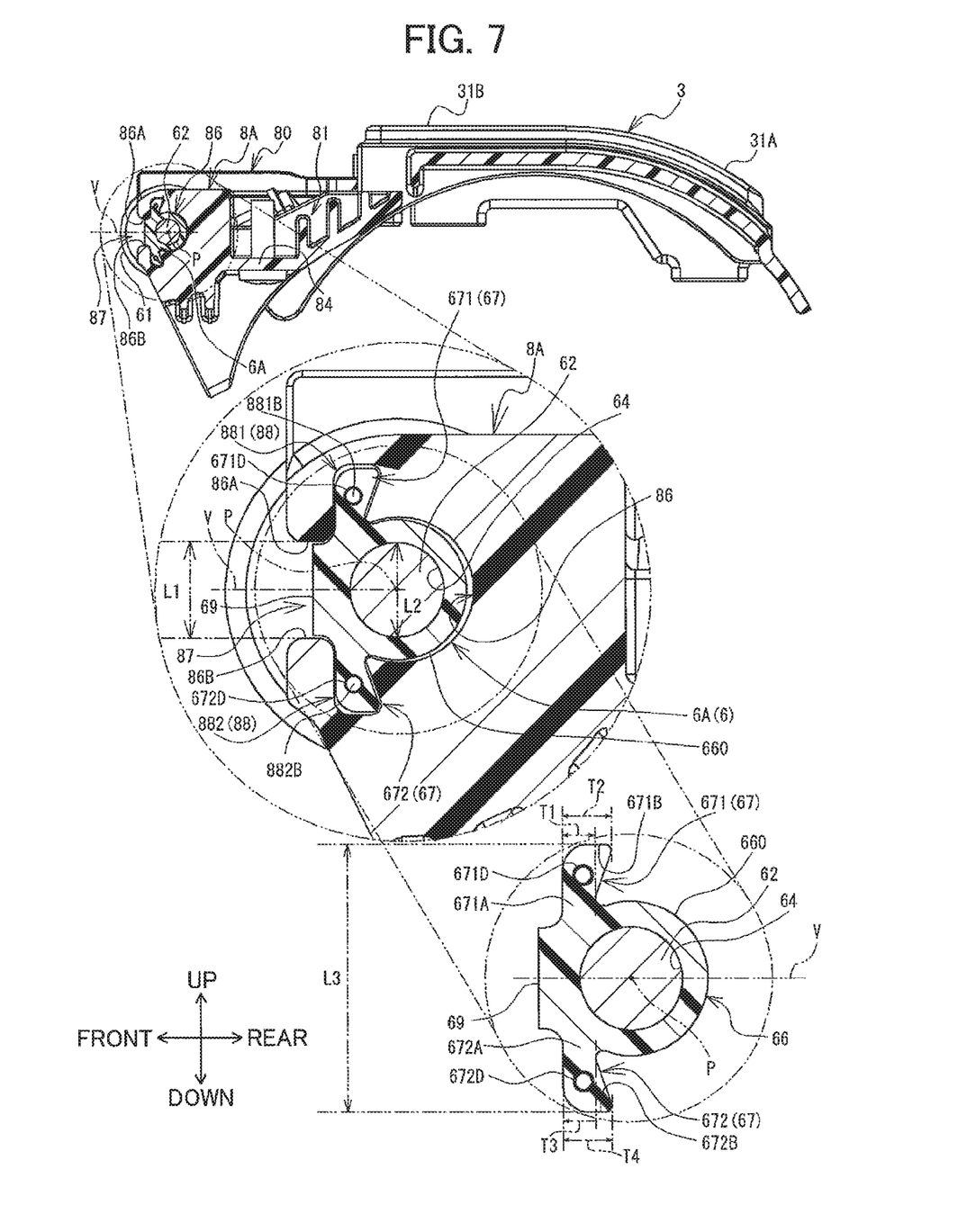
FIG. 7 illustrates a cross-sectional view taken along a line B-B in FIG. 1 as viewed in a direction shown by an arrow, and illustrating a partial enlarged view of the cross-sectional view.

As illustrated in FIG. 5, the platen roller 60 includes the platen 61 and a rotational shaft 62. The platen 61 is a hollow cylindrical member extending in the leftward/rightward direction. The platen 61 has a length in the leftward/rightward direction slightly smaller than a distance between the fitting portions 8A and 8B. The platen 61 is positioned at the platen receiving portion 82A, that is, at a portion covered by the fitting portions 8A and 8B from the right side and the left side, respectively. The platen 61 has a through-hole (not illustrated) that penetrates a diametrical center of the platen 61 in the leftward/rightward direction. The rotational shaft 62 is a solid cylindrical shaft member extending through the through-hole of the platen 61 in the leftward/rightward direction. The rotational shaft 62 has each end portion in the leftward/rightward direction protruding outward from the corresponding end in the leftward/rightward direction of the platen 61. The platen 61 is fixed to the rotational shaft 62 and is rotatable integrally with the rotational shaft 62. As illustrated in FIG. 7, the rotational shaft 62 has an outer diameter L2 (see FIG. 6) smaller than the gap distance L1 of the opening portion 87.

[Bearing 6]

As illustrated in FIG. 5, a bearing 6 is provided at each end portion in the leftward/rightward direction of the rotational shaft 62 of the platen roller 60. The bearing 6 includes a bearing 6A and a bearing 6B. The bearing 6A is provided at an end portion of the rotational shaft 62 protruding rightward from the platen 61. The bearing 6B is provided at an end portion of the rotational shaft 62 protruding leftward from the platen 61. With this configuration, the rotational shaft 62 is rotatable relative to the bearings 6A and 6B. The bearings 6A and 6B have symmetrical shapes as each other in the leftward/rightward direction. In the following description, only the bearing 6A will be described, and a description of the bearing 6B will be omitted. Technical terms and reference numerals of components of the bearing 6A are also applied to those of the components of the bearing 6B.

The bearing 6A is a generally hollow cylindrical member having a through-hole 64 into which the rotational shaft 62 is inserted. The through-hole 64 defines a center axis P that passes through a diametrical center of the through-hole 64. The center axis P extends in the leftward/rightward direction. Further, the center axis P extends through a diametrical center of the platen 61, and a diametrical center of the rotational shaft 62.

The bearing 6A includes a large diameter support portion 68 and a small diameter support portion 66. The large diameter support portion 68 has a hollow cylindrical shape and is positioned rightward of the small diameter support portion 66. In other words, the large diameter support portion 68 constitutes a right part of the bearing 6A. The small diameter support portion 66 has a generally hollow cylindrical shape and constitutes a left part of the bearing 6A. The small diameter support portion 66 has an outer diameter smaller than that of the large diameter support portion 68. The small diameter support portion 66 is coaxially connected to a left end of the large diameter support portion 68. The through-hole 64 extends from the right end of the large diameter support portion 68 to the left end of the small diameter support portion 66. Specifically, the through-hole 64 extends through the large diameter support portion 68 and the small diameter support portion 66 in the leftward/rightward direction.

Hereinafter, a boundary surface between the large diameter support portion 68 and the small diameter support portion 66 will be referred to as a "stepped surface 681" (see the bearing 6B in FIG. 5). The stepped surface 681 connects an outer circumferential surface 661 of the small diameter support portion 66 and an outer circumferential surface of the large diameter support portion 68. The stepped surface 681 is perpendicular to the center axis P, and has a ring shape as viewed from the left side. A protrusion 69 is provided on a part of the front side of the outer circumferential surface 660. Further, an engaging portion 67 is provided at a part of the outer circumferential surface 660. The engaging portion 67 includes a pair of engaging portions 671 and 672.

As illustrated in FIG. 7, the engaging portion 671 is provided above the protrusion 69, and protrudes upward from the outer circumferential surface 660 of the small diameter support portion 66. The engaging portion 671 has a front surface extending in the upward/downward direction. The engaging portion 671 has a rear surface sloping rearward with distance from the outer circumferential surface 660. Therefore, the engaging portion 671 has a trapezoidal shape as viewed in the leftward/rightward direction such that a length between the front surface and the rear surface is gradually increased with distance from the outer circumferential surface 660. That is, a shape of engagement portion 881 is substantially the same as a shape of the engaging portion 671 as viewed in the leftward/rightward direction. Specifically, the shape of the engagement portion 881 is slightly greater than the shape of the engaging portion 671 as viewed in the leftward/rightward direction.

In the following description, a lower end portion (i.e., base end portion) of the engaging portion 671 will be referred to as a "first part 671A", and a portion of the engaging portion 671 other than the first part 671A will be referred to as a "second part 671B". The second part 671B has a length T2 in the frontward/rearward direction greater than a length T1 in the frontward/rearward direction of the first part 671A. Incidentally, the length T2 is a maximum length in the frontward/rearward direction of the second part 671B.

Further, hereinafter, a surface of the engaging portion 671 facing leftward will be referred to as a "specific surface 671C" (see the specific surface 671C in the bearing 6B as illustrated in FIG. 5. Here, the specific surface 671C in the bearing 6B faces rightward). The specific surface 671C is formed with a fitting recess 671D having a shape in conformance with a shape of the protruding portion 881B as viewed from the left side thereof. The fitting recess 671D is recessed rightward from an approximate center portion of the specific surface 671C. Specifically, the fitting recess 671D has a circular shape as viewed from the left side, and has an inner diameter slightly greater than an outer diameter of the protruding portion 881B. Further, the fitting recess 671D has a length in the leftward/rightward direction (depth) slightly greater than a length in the leftward/rightward direction (protruding length) of the protruding portion 881B.

The engaging portion 672 is positioned below the protrusion 69, and protrudes downward from the outer circumferential surface 660 of the small diameter support portion 66. The engaging portion 672 has a front surface extending in the upward/downward direction. The engaging portion 672 has a rear surface sloping rearward with distance from the outer circumferential surface 660. Therefore, the engaging portion 672 has a trapezoidal shape as viewed in the leftward/rightward direction such that a length between the front surface and the rear surface is gradually increased with distance from the outer circumferential surface 660. That is, a shape of engagement portion 882 is substantially the same as a shape of the engaging portion 672 as viewed in the leftward/rightward direction. Specifically, the shape of the engagement portion 882 is slightly greater than the shape of the engaging portion 672 as viewed in the leftward/rightward direction.

In the following description, an upper end portion (i.e., base end portion) of the engaging portion 672 will be referred to as a "first part 672A", and a portion of the engaging portion 672 other than the first part 672A will be referred to as a "second part 672B". The second part 672B has a length T4 in the frontward/rearward direction greater than a length T3 in the frontward/rearward direction of the first part 672A. Incidentally, the length T4 is a maximum length in the frontward/rearward direction of the second part 672B.

Further, hereinafter, a surface of the engaging portion 672 that faces leftward will be referred to as a "specific surface 672C" (see the specific surface 672C in the bearing 6B illustrated in FIG. 5. Here, the specific surface 672C in the bearing 6B faces rightward). The specific surface 672C is formed with a fitting recess 672D having a shape in conformance with a shape of the protruding portion 882B as viewed from left side. The fitting recess 672D is recessed rightward from a center portion of the specific surface 672C. Specifically, the fitting recess 672D has a circular shape as viewed from the left side, and has an inner diameter slightly greater than an outer diameter of the protruding portion 882B. Further, the fitting recess 672D has a length in the leftward/rightward direction (depth) slightly greater than a length in the leftward/rightward direction (protruding length) of the protruding portion 882B.

The small diameter support portion 66 has a dimension L3 in the upward/downward direction between an upper end of the engaging portion 671 and a lower end of the engaging portion 672. The dimension L3 is greater than the gap distance L1 of the opening portion 87. Specifically, in the present embodiment, the dimension L3 is two and a half (2.5) times as large as the gap distance L1. However, this configuration is merely an example.

[Attachment of Platen Roller 60 to Holder 80]

As illustrated in FIG. 5, the platen roller 60 is attached to the holder 80 from the front side of the holder 80. The right end portion of the rotational shaft 62 is inserted through the opening portion 87 (see FIG. 6) of the fitting portion 8A and disposed in the inner space of the receiving portion 86 of the fitting portion 8A. Thus, the right end portion of the rotational shaft 62 protrudes rightward from the fitting portion 8A. The left end portion of the rotational shaft 62 is inserted through the opening portion 87 of the fitting portion 8B and disposed in the inner space of the receiving portion 86 of the fitting portion 8B. Thus, the left end portion of the rotational shaft 62 protrudes leftward from the fitting portion 8B.

Here, as illustrated in FIG. 7, the gap distance L1 of the opening portion 87 is greater than the outer diameter L2 of the rotational shaft 62. Therefore, through the opening portion 87, each end portion of the rotational shaft 62 can be easily inserted into the corresponding inner space of the receiving portion 86.

Then, as illustrated in FIG. 5, the right end portion of the rotational shaft 62 is inserted through the through-hole 64 of the bearing 6A from the left side thereof. In this way, the bearing 6A is assembled to the right end portion of the rotational shaft 62. Likewise, the left end portion of the rotational shaft 62 is inserted through the through-hole 64 of the bearing 6B from the right side thereof. In this way, the bearing 6B is assembled to the left end portion of the rotational shaft 62. Here, the shape of the small diameter support portion 66 is in conformance with the general C-shape of the receiving portion 88. As illustrated in FIG. 7, the outer circumferential surface 660 excluding the pair of engaging portions 671 and 672 of the small diameter support portion 66 is received by the receiving portion 86, whereby the bearing 6 is fitted into the fitting portion 8. By the fitting engagement of the bearing 6 into the fitting portion 8, the engaging portion 671 is engaged with the engagement portion 881, and the engaging portion 672 is engaged with the engagement portion 882. At this time, the stepped surface 681 of the bearing 6 is in abutment with the stepped surface 862 of the fitting portion 8 (see FIG. 5).

In accordance with the respective engagement between the pair of engaging portions 671 and 672 and the pair of engagement portions 881 and 882, the protruding portion 881B is fitted with the fitting recess 671D, and the protruding portion 882B is fitted with the fitting recess 672D. Further, at this time, the abutment surface 881A (see FIG. 6) is in abutment with the specific surface 671C (see FIG. 5), and the abutment surface 882A (see FIG. 6) is in abutment with the specific surface 672C (see FIG. 5). The bearing 6 rotatably supports each end portion in the leftward/rightward direction of the rotational shaft 62 in a state where the bearing 6 is fitted with the fitting portion 8.

As illustrated in FIG. 7, the engagement portion 881 is positioned above the center axis P of the through-hole 64, and the engagement portion 882 is positioned below the center axis P in a state where the bearing 6 is fitted with the fitting portion 8. Similarly, the engaging portion 671 is positioned above the center axis P, and the engaging portion 672 is positioned below the center axis P. Here, an imaginary plane V passing through the center axis P and parallel to the frontward/rearward direction as viewed in the leftward/rightward direction is defined. With this definition, the engagement portions 881 and 882 are positioned symmetrically with each other with respect to the imaginary plane V in the upward/downward direction. Further, the engaging portions 671 and 672 are positioned symmetrically with each other with respect to the imaginary plane V in the upward/downward direction.

As illustrated in FIG. 2, a gear 65 is fixed to the end portion of the rotational shaft 62 protruding leftward from the left end of the bearing 6B. The gear 65 is integrally rotatable with the platen roller 60. A thread 681A is threadingly engaged with each through-hole 81B (see FIG. 5) from below in a state where the platen roller 60 and the bearing 6 are assembled to the holder 80. Thus, the holder 80 is fixed to the second portion 31B of the second cover 3 by means of the threads 681A while the platen roller 60 and the bearing 6 are assembled to the holder 80.

[Opening/Closing Operation of Second Cover 3]

As illustrated in FIG. 2, the second cover 3 is supported to the first cover 2 and is pivotally movable about each shaft portion 252 inserted through the hole of each protruding portion 311. The springs 253 (see FIG. 3) mounted on the shaft portions 252 urge the second cover 3 from the closed position (see FIG. 1) toward the open position (see FIG. 2). When the second cover 3 is pivotally moved in the counter-clockwise direction against the biasing force of the springs 253, the second cover 3 is moved to the closed position. In the closed position of the second cover 3 illustrated in FIG. 1, the rear edge portion 21A of the first cover 2 is positioned adjacent to a front edge of the second portion 31B of the second cover 3, thereby providing a discharge opening 20 therebetween. The printing medium that has been printed inside the printing device 1 is discharged outside through the discharge opening 20.

Figure 8:
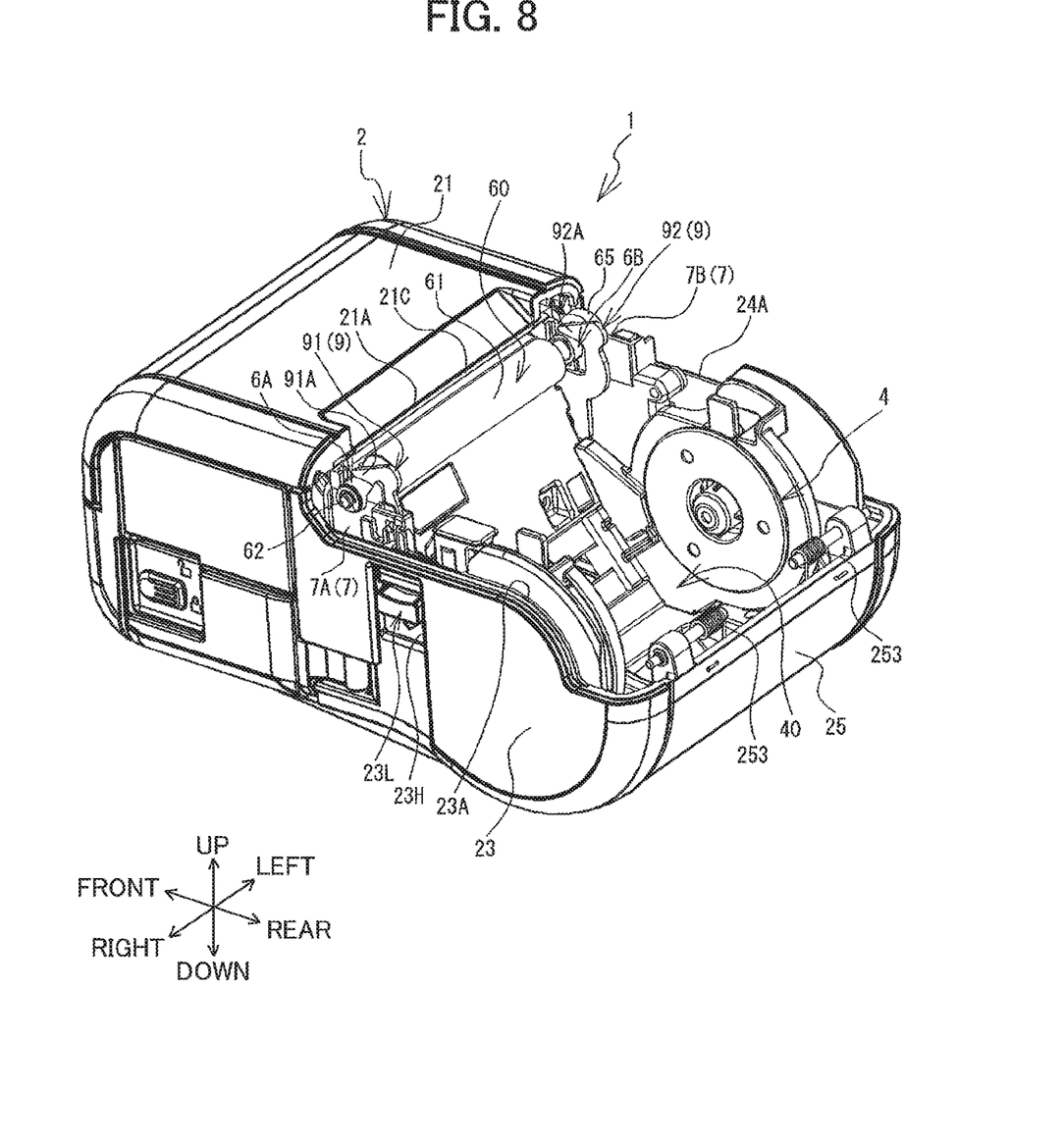
FIG. 8 is a perspective view of the printing device 1 according to the embodiment, and illustrating the platen roller 60 and the bearing 6 in a state where the second cover 3 at its closed position is omitted.

As illustrated in FIG. 8, the platen roller 60 faces the thermal head 21P provided at the inner wall portion 27 (see FIG. 3) when the second cover 3 is in the closed position. The platen 61 presses the printing medium against the thermal head 21P in a state where the printing medium is positioned between the platen 61 and the thermal head 21P. When the motor (not illustrated) is rotated, the gear 65 is also rotated. At this time, the platen 61 is rotated in association with the rotation of the gear 65. With this rotation, the platen 61 is configured to convey the printing medium toward the discharge opening 20 while the platen 61 presses the printing medium against the thermal head 21P.

As illustrated in FIG. 4, the bearing 6A is engaged with the recessed portion 71A of the support portion 7A from above. The protruding portion 91A of the restriction member 91 at its restricting state is in contact with the bearing 6A from above. As illustrated in FIG. 8, the bearing 6B is engaged with the recessed portion 72A (see FIG. 3) of the support portion 7B from above. The protruding portion 92A of the restriction member 92 at its restricting state is in contact with the bearing 6B from above. Accordingly, the restriction mechanism 9 prevents the platen roller 60 from moving upward. The restriction mechanism 9 can maintain the second cover 3 in its closed position, and prevent the second cover 3 from pivotally moving toward the open position due to the biasing force of the springs 253.

When the lever 23L (see FIG. 1) is moved downward while the second cover 3 is in the closed position, each of the restriction members 91 and 92 is moved to the non-restricting state. In this way, the protruding portion 91A of the restriction member 91 is positioned rearward of the recessed portion 71A of the support portion 7, and the protruding portion 92A of the restriction member 92 is positioned rearward of the recessed portion 72A. Thus, upward movement of the bearing 6 is no longer restricted by the restriction mechanism 9. The second cover 3 is pivotally moved in the clockwise direction by the biasing force of the springs 253, so that the second cover 3 is moved to the open position (see FIG. 2).

[Function and Effect in the Embodiment]

In a case where the printing device 1 is dropped, an external force directed in the frontward direction may be applied to the bearing 6 fitted into the fitting portion 8 due to impact of dropping the printing device 1. At this time, the pair of engaging portions 671 and 672 is engaged with the pair of engagement portions 881 and 882, respectively. By virtue of these engagements, a deformation of the opening portion 87 expanding in the upward/downward direction can be prevented since the engagement portions 881 and 882 is positioned adjacent to the opening portion 87. Accordingly, disengagement of the bearing 6 from the holder 80 can be restrained in the printing device 1.

According to the above-described embodiment, the engagement portions 881 and 882 are recessed from the receiving portion 86 while the engagement portions 881 and 882 have the shapes substantially the same as the shapes of the engaging portions 671 and 672, respectively. Further, the length T2 in the frontward/rearward direction of the second part 671B of the engaging portion 671 is greater than the length T1 in the frontward/rearward direction of the first part 671A. Similarly, the length T4 in the frontward/rearward direction of the second part 671B of the engaging portion 672 is greater than the length T3 in the frontward/rearward direction of the first part 672A. Therefore, the engaging portions 671 and 672 are not disengaged from the engagement portions 881 and 882, respectively, even if an external force directed in the frontward direction is applied to the bearing 6 fitted with the fitting portion 8. Accordingly, disengagement of the bearing 6 from the holder 80 can further be restrained in the printing device 1.

According to the above-described embodiment, each of the protruding portions 881B and 882B protrudes in the leftward/rightward direction to be fitted with the corresponding fitting recess 671D and 672D. Therefore, even if an external force directed in the frontward direction is applied to the bearing 6 fitted with the fitting portion 8, disengagement of the bearing 6 from the holder 80 can be restrained. Accordingly, disengagement of the bearing 6 from the holder 80 can further be restrained in the printing device 1.

According to the above-described embodiment, in a state where the bearing 6 is fitted into the fitting portion 8, the engaging portions 671 and 672 are positioned symmetrically with each other with respect to the imaginary plane V passing through the center axis P of the through-hole 64 and extending in the frontward/rearward direction as viewed in the leftward/rightward direction. Similarly, the engagement portions 881 and 882 are positioned symmetrically with each other with respect to the imaginary plane V. That is, the engaging portions 671 and 672 are engaged with the engagement portions 881 and 882, respectively, at positions above and below the opening portion 87. With this configuration, deformation of the opening portion 87 to expand in the upward/downward direction can be restrained at positions below and above the opening portion 87. Accordingly, disengagement of the bearing 6 from the holder 80 can further be restrained in the printing device 1.

[Correspondences]

In the present embodiment, the small diameter support portion 66 is an example of a support portion. The leftward/rightward direction is an example of an axial direction. The frontward/rearward direction is an example of a first direction. The upward/downward direction is an example of a second direction. The engaging portions 671 and 672 are examples of a first engaging portion and a second engaging portion. The engagement portions 881 and 882 are examples of a first engagement portion and a second engagement portion.

[Modification to the Embodiment]

Various modifications may be conceivable. For example, the engaging portion 67 and the engagement portion 88 have trapezoidal shapes in the above-described embodiment. However, other shapes may be employed. A modification to the embodiment will be described while referring to FIG. 9, wherein like parts and components are designated by the same reference numerals as those shown in the embodiment to avoid duplicating description. In the modification, an engaging portion 77 and an engagement portion 98 have shapes different from the shape of the engaging portion 67 and the engagement portion 88, respectively.

Figure 9:
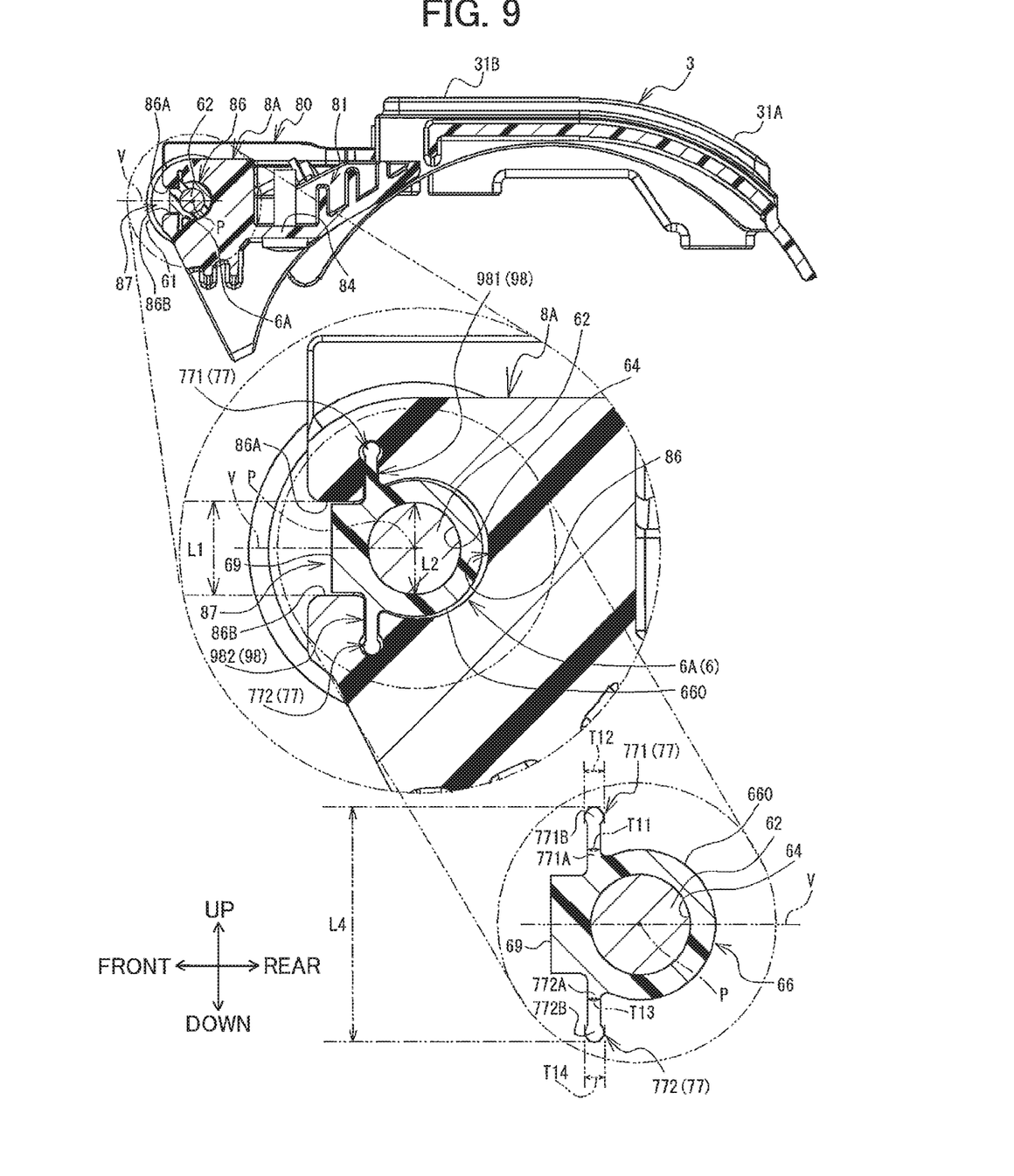
FIG. 9 illustrates a cross-sectional view taken along a line corresponding to the line B-B in FIG. 1 as viewed in the direction shown by the arrow according to a modification of the embodiment, and illustrating a partial enlarged view of the cross-sectional view.

The engaging portion 77 is provided at a part of the outer circumferential surface 660 of the small diameter support portion 66. The engaging portion 77 includes a pair of engaging portions 771 and 772. The engaging portion 771 is positioned adjacent to an upper side of the protrusion 69, and protrudes upward from the outer circumferential surface 660 of the small diameter support portion 66. The engaging portion 771 protrudes upward with a constant length in the frontward/rearward direction, and has an upper end provided with an enlarged portion. As viewed in the leftward/rightward direction, the enlarged portion has a generally circular shape having an outer diameter greater than a length in the frontward/rearward direction of a lower end portion of the engaging portion 771.

In the following description, the lower end portion (i.e., base end portion) of the engaging portion 771 will be referred to as a "first part 771A", and a portion of the engaging portion 771 other than the first part 771A will be referred to as a "second part 771B". The second part 771B has a maximum length T12 in the frontward/rearward direction greater than a length T11 in the frontward/rearward direction of the first part 771A. The length T12 is equal to the outer diameter of the enlarged portion.

The engaging portion 772 is positioned adjacent to a lower side of the protrusion 69, and protrudes downward from the outer circumferential surface 660 of the small diameter support portion 66. The engaging portion 772 protrudes upward with a constant length in the frontward/rearward direction, and has a lower end provided with an enlarged portion. As viewed in the leftward/rightward direction, the enlarged portion has a generally circular shape having an outer diameter greater than a length in the frontward/rearward direction of an upper end portion of the engaging portion 771.

In the following description, the upper end portion (i.e., base end portion) of the engaging portion 772 will be referred to as a "first part 772A", and a portion of the engaging portion 772 other than the first part 772A will be referred to as a "second part 772B". The second part 772B has a maximum length T14 in the frontward/rearward direction greater than a length T13 in the frontward/rearward direction of the first part 772A. The length T14 is equal to the outer diameter of the enlarged portion. Different from the above-described embodiment, the engaging portions 771 and 772 are not formed with fitting recesses corresponding to the fitting recesses 671D and 672D respectively formed in the engaging portions 671 and 672 in the above-described embodiment.

The engagement portion 98 is provided in the receiving portion 86 at a position adjacent to the opening portion 87. The engagement portion 98 includes a pair of engagement portions 981 and 982. The engagement portion 981 is positioned near a rear end of the distal end portion 86A, and is recessed upward from the receiving portion 86. The engagement portion 982 is positioned near a rear end of the distal end portion 86B, and is recessed downward from the receiving portion 86.

Each of the pair of engagement portions 981 and 982 has a shape substantially the same as the shape of the each of the pair of engaging portions 771 and 772 as viewed in the leftward/rightward direction. Specifically, the pair of engagement portions 981 and 982 is slightly greater than the pair of engaging portions 771 and 772, as viewed in the leftward/rightward direction. Each of the pair of engagement portions 981 and 982 extends through the fitting portion 8 in the leftward/rightward direction. That is, the abutment surfaces 881A, 882A and the protruding portions 881B, 882B, those respectively provided in the engagement portions 881 and 882 in the above-described embodiment, are not provided in the pair of engagement portions 981 and 982.

The engaging portions 771 and 772 are engaged with the engagement portions 981 and 982, respectively, upon fitting engagement of the bearing 6 with the fitting portion 8. At this time, the stepped surface 681 is in abutment with the stepped surface 862 (see FIG. 5). In a state where the bearing 6 is fitted with the fitting portion 8, the engagement portion 981 is positioned above the center axis P, and the engagement portion 982 is positioned below the center axis P. Similarly, the engaging portion 771 is positioned above the center axis P, and the engaging portion 772 is positioned below the center axis P. The engagement portions 981 and 982 are positioned symmetrically with each other with respect to the imaginary plane V. Further, the engaging portions 771 and 772 are positioned symmetrically with each other with respect to the imaginary plane V.

The small diameter support portion 66 has a dimension L4 in the upward/downward direction between an upper end of the engaging portion 771 and a lower end of the engaging portion 772. The dimension L4 is greater than the gap distance L1 of the opening portion 87. In this modification, the dimension L4 is two and a half (2.5) times as large as the gap distance L1. However, this configuration is merely an example.

According to the modification to the embodiment, the engagement portions 981 and 982 are positioned symmetrically with each other with respect to the vertical plane V at positions adjacent to the opening portion 87 of the receiving portion 86. By virtue of the engagements between the engagement portions 981, 982 and the engaging portions 771, 772, deformation of the opening portion 87 to expand in the upward/downward direction can be restrained at positions above and below the opening portion 87, even if an external force directed in the frontward direction is applied to the bearing 6 fitted into the fitting portion 8. Accordingly, disengagement of the bearing 6 from the holder 80 can be restrained in the printing device 1.

[Other Variations]

In the above-described embodiment, the protruding portions 881B and 882B are provided at the abutment surfaces 881A and 882A, respectively, and the fitting recesses 671D and 672D are formed at the specific surfaces 671C and 672C, respectively. However, the protruding portions 881B and 882B may be provided at the specific surfaces 671C and 672C, respectively, and the fitting recesses 671D and 672D may be formed at the abutment surfaces 881A and 882A, respectively. Alternatively, the holder 80 may not have the protruding portions 881B and 882B, and the abutment surfaces 881A and 882A. That is, the engagement portions 881 and 882 may extend through the fitting portion 8 in the leftward/rightward direction.

In the above-described embodiment, the rear sides of the engaging portion 67 and the engagement portion 88 are sloped rearward with the distance from the outer circumferential surface 660, and the distances in the frontward/rearward direction between the front sides and the rear sides are gradually increased with the distances from the outer circumferential surface 660. Therefore, the engaging portion 67 and the engagement portion 88 have generally trapezoidal shapes as viewed in the leftward/rightward direction. However, the front sides of the engaging portion 67 and the engagement portion 88 may be sloped frontward with the distance from the outer circumferential surface 660, and the distances in the frontward/rearward direction between the front sides and the rear sides may be gradually increased with the distance from the outer circumferential surface 660. With such a configuration, the engaging portion 67 and the engagement portion 88 may have generally trapezoidal shapes as viewed in the leftward/rightward direction.

In a state where the bearing 6 is fitted with the fitting portion 8, the pair of engaging portions 671, 672 may have asymmetric configuration with respect to the imaginary plane V, and the pair of engagement portions 881, 882 may have asymmetric configuration with respect to the imaginary plane V. Further, the bearing 6 may only include either one of the engaging portions 671 and 672 in the engaging portion 67, or three or more engaging portion 67 may be provided. The fitting portion 8 may include the engagement portion 88 with its numbers equal to the numbers of the engaging portion 67 provided that the engagement portion 88 is provided at a position corresponding to the engaging portion 67.

While the description has been made in detail with reference to the specific embodiments, it would be apparent to those skilled in the art that various changes and modifications may be made thereto.

What is claimed is:

1. A printing device comprising:
   a platen roller having a rotational shaft extending in an axial direction, the rotational shaft having end portions in the axial direction;
   a pair of bearings each rotatably supporting each end portion of the rotational shaft, each of the pair of bearings comprising:
      a support portion having a generally hollow cylindrical shape and formed with a through-hole through which the rotational shaft extends, the support portion having an outer circumferential surface; and
      an engaging portion provided at the outer circumferential surface of the support portion; and
   a holder including a pair of fitting portions, each of the pair of bearings being fitted into each of the pair of fitting portions, each of the pair of fitting portions including:
      a receiving portion configured to contact the outer circumferential surface of the support portion to receive the support portion, the receiving portion having one end in a first direction crossing the axial direction, the receiving portion having a pair of distal ends facing each other to provide a gap therebetween at the one end of the receiving portion, the receiving portion having a generally C-shape as viewed in the axial direction;
      an opening portion serving as the gap defined between the pair of distal ends of the receiving portion; and
      an engagement portion positioned adjacent to the opening portion, the engaging portion being engaged with the engagement portion, whereby an expanding deformation of the opening portion in a second direction crossing the axial direction and the first direction can be restrained in a case where an external force directed in a direction toward the opening portion in the first direction is applied to the bearings.

2. The printing device according to claim 1, wherein the engaging portion protrudes outward in the second direction from the outer circumferential surface of the support portion, the engaging portion including a first part which is a base end portion of the engaging portion and a second part other than the first part, the second part having a maximum length in the first direction greater than a length of the first part in the first direction, and
   wherein the engagement portion has a shape substantially the same as a shape of the engaging portion as viewed in the axial direction, the engagement portion being recessed from the receiving portion to be engaged with the engaging portion.

3. The printing device according to claim 1, wherein the engaging portion has a specific surface crossing the axial direction, and
   wherein the engagement portion has an abutment surface configured to abut against the specific surface,
   the printing device further comprising:
   a protruding portion protruding in the axial direction from one of the specific surface and the abutment surface; and
   a fitting recess recessed in the axial direction from remaining one of the specific surface and the abutment surface, the protruding portion being fitted into the fitting recess upon engagement of the engaging portion with the engagement portion.

4. The printing device according to claim 1, wherein the through-hole has a center axis extending in the axial direction to define an imaginary plane, the imaginary plane containing the center axis and being parallel to the first direction,
   wherein the engaging portion includes a first engaging portion and a second engaging portion, the first engaging portion and the second engaging portion being positioned symmetrically to each other with respect to the imaginary plane, and
   wherein the engagement portion includes a first engagement portion and a second engagement portion, the first engagement portion and the second engagement portion being positioned symmetrically to each other with respect to the imaginary plane.

* * * * *